US009317929B2

(12) United States Patent
Zhang et al.

(10) Patent No.: US 9,317,929 B2
(45) Date of Patent: Apr. 19, 2016

(54) DECOMPOSITION APPARATUS AND METHOD FOR REFINING COMPOSITION OF MIXED PIXELS IN REMOTE SENSING IMAGES

(71) Applicant: HITACHI, LTD., Tokyo (JP)

(72) Inventors: Dai Zhang, Shanghai (CN); Xue Zhang, Shanghai (CN)

(73) Assignee: HITACHI, LTD., Tokyo (JP)

( * ) Notice: Subject to any disclaimer, the term of this patent is extended or adjusted under 35 U.S.C. 154(b) by 46 days.

(21) Appl. No.: 13/915,101

(22) Filed: Jun. 11, 2013

(65) Prior Publication Data

US 2013/0336540 A1     Dec. 19, 2013

(30) Foreign Application Priority Data

Jun. 14, 2012   (CN) .......................... 2012 1 0197112

(51) Int. Cl.
*G06T 7/40*        (2006.01)
*G06T 7/00*        (2006.01)

(52) U.S. Cl.
CPC ................. *G06T 7/40* (2013.01); *G06T 7/0081* (2013.01); *G06T 7/0087* (2013.01); *G06T 7/404* (2013.01); *G06T 2207/10032* (2013.01); *G06T 2207/20076* (2013.01); *G06T 2207/20081* (2013.01); *G06T 2207/30181* (2013.01)

(58) Field of Classification Search
CPC . G06K 9/6224; G06K 9/6253; G06K 9/0063; G06K 2009/4657; G01S 17/89; G01S 7/497; G06T 2207/10036; G06T 2207/20101; G06T 2207/30181; G06T 2207/30184; G06T 7/0081
USPC ......................................................... 382/108
See application file for complete search history.

(56) References Cited

FOREIGN PATENT DOCUMENTS

CN    101221243       7/2008
CN    101221662       7/2008
CN    102054273 A     5/2011

OTHER PUBLICATIONS

Sen, "Unsupervised Hypersectral Unmixing Theory and Techniques," Dec. 1, 2007, College of Computer Science, Zhejiang University, Doctoral Dissertation.*
Sen, Jia; "Unsupervised Study of Hyperspectral Unmixing Methods", Doctoral Dissertation; College of Computer Science of Zhejiang University; Dec. 1, 2007.

* cited by examiner

*Primary Examiner* — Vu Le
*Assistant Examiner* — Kenny Cese
(74) *Attorney, Agent, or Firm* — Mattingly & Malur, PC

(57) ABSTRACT

To achieve space correlation of pixel decomposition results and reduce noise problem caused by isolation, there is provided a decomposition apparatus and method for refining composition of mixed pixels in remote sensing images, including: a preprocessing step for temporarily determining the provability value of the composition ratio of the different land cover types of each pixel in the image, based on a received remote sensing image and spectral information, to obtain first material composition information; and a neighborhood correlation calculation step for analyzing the correlation between a main pixel and the neighboring areas by using the first material composition information of each of the pixels present in the neighboring areas within a predetermined range in which the pixels are adjacent to each other, and optimizing the first material composition information of the main pixel by the result of the correlation analysis, to obtain second material composition information.

7 Claims, 9 Drawing Sheets

DECOMPOSITION APPARATUS AND METHOD FOR REFINING COMPOSITION OF MIXED PIXELS IN REMOTE SENSING IMAGES

CLAIM OF PRIORITY

The present application claims priority from Chinese patent application CN 201210197112.1 filed on Jun. 14, 2012, the content of which is hereby incorporated by reference into this application.

BACKGROUND OF THE INVENTION

1. Field of the Invention

The present invention relates to a remote image processing technology, and more particularly, to a decomposition apparatus for refining composition of mixed pixels and a decomposition method for refining composition of mixed pixels in remote sensing images, to perform analysis and processing of remote sensing images.

2. Description of the Related Art

The remote sensing technology has been developing since its introduction in 1960s until today in general technologies involving modern physics, space science, computer technology, mathematical methods, and earth science theories. The remote sensing technology plays more and more important role in the study of the Earth's surface resources.

With the development of the image forming technology, the application in the fields of multi-frequency remote sensing images has been increasing. Due to the optical and physical characteristics of the imaging sensor as well as the complexity of the Earth's surface to be monitored, a plurality of land cover types are often included in one pixel (which is called a mixed pixel) in the obtained remote sensing image. In order to improve the accuracy of land cover analysis, it is necessary to extract the composition ratio of each type of land cover from the mixed pixel based on the spectral characteristics of the land cover.

Currently, such a mixed pixel decomposition method for extracting the composition ratio of each type of land cover from the mixed pixel is the spectrum mixed model for mainly analyzing one pixel. The spectrum mixed model performs analysis according to different mixing methods for each pixel. For example, Patent document 1 (Chinese patent CN 101221243 A) discloses a decomposition method of mixed pixels of remote sensing images based on non-negative matrix factorization. Further, Patent document 2 (Chinese patent CN 102054273 A) discloses a decomposition method of mixed pixels of hyperspectral remote sensing images based on monomer triangle decomposition. More specifically, in Patent documents 1 and 2, the decomposition method assumes that one mixed pixel is a spectral linear mixture of a plurality of end members, extracting the end members to obtain the components of each land cover type in the mixed pixel by the non-negative matrix factorization iterative calculation method or the triangle decomposition method. Here, the end member means each type of pure substance appearing in the image. It appears as a pure pixel having only a single substance in the image. Further, the end member vector is a spectral vector that maps a certain kind of pure substance into multi-dimensional spectral space. When the end member vector is selected, each type of substance selects only one pure pixel.

Further, Patent document 3 (Chinese patent CN 101221662 A) discloses a decomposition method of mixed pixels of remote sensing images based on self-organization mapping neutral network. The decomposition method also assumes that the spectral mixing method is a linear form, and calculates the component information after decomposition by the self-organization mapping neutral network combined with the fussy membership of fussy theory. In Patent document 3, monitoring training is first performed for the self-organization mapping neutral network, and then the mixed pixel is decomposed based on the fussy model.

Further, Non-patent document 1 ("Unsupervised study of hyperspectral unmixing methods", doctoral dissertation presented by Sen Jia in the College of Computer Science of Zhejiang University) discloses a mixed pixel unmixing method for directly extracting the end member spectrum and its composition information from the remote sensing image, under the condition that the end member information is completely unknown, by using the unsupervised signal processing (independent components analysis (ICA)) method, based on the constraints such as non-negative conditions of the spectrum mixed model and the end member in the mixed pixel. This study performs the unsupervised signal unmixing by combining Markov Random Field (MFR) with ICA, while taking into account the continuity of the signal in space to achieve better unmixing effect than fast ICA. However, the prerequisite of the unsupervised ICA unmixing is the complete independence of the signal as well as the stability of the data statistical characteristics. It is difficult to satisfy the condition in the process of remote sensing images in multiple frequency bands. For this reason, this method is not suitable for the decomposition of mixed pixels of remote sensing images.

In the related art described above, all the decomposition models involved can perform independent decomposition for a single mixed pixel. However, the individual pixels in the image are not completely independent of each other due to the continuity of the landscape in the image or other reasons. Thus, an inconsistency may exist in the decomposition results of neighboring pixels, and a problem may occur due to the situation that the decomposition results have nothing to do with the spatial relations.

Also in the relation art described above, the decomposition results may not show the correlation between land cover types with respect to the decomposition of the pixel in the boundary of the other land cover type. Thus, the decomposition results are not appropriate, and noise is also present. In particular, isolation may occur in the decomposition results. In other words, a certain type, which is decomposed from a certain pixel, is not present in other pixels in the local area, or the appearance of the type in the particular local area is not appropriate.

SUMMARY OF THE INVENTION

The present invention has been made to solve the above problems of the related art. Thus, an object of the present invention is to provide a decomposition apparatus for refining composition of mixed pixels as well as a decomposition method for refining composition of mixed pixels in remote sensing images, in order to achieve spatial correlation between pixel decomposition results and to reduce noise caused by isolation.

The technical aim of the present invention is to obtain more accurate land cover information by analyzing the correlation of neighboring areas in the multi-dimensional space, optimizing the decomposition result with respect to the composition ratio of land cover types in the main pixel by using the composition ratio of each land cover type in the correlated pixels within the neighborhood region, and further decomposing the land cover component of the pixel in the sub-pixel layer.

The present invention is a decomposition method for refining composition of mixed pixels in remote sensing images to decompose a pixel in which a plurality of types of land cover are mixed into components of different types of land cover, by using the spectral reflectance characteristics of the different land cover types. The decomposition method includes: a receiving step for receiving a remote sensing image and spectral information corresponding to the received remote sensing image; a preprocessing step for temporarily determining the probability value of the composition ratio of different land cover types in each pixel of the image, based on the received remote sensing image and the spectral information, to obtain first material composition information; and a neighborhood correlation calculation step for analyzing the correlation between a main pixel and the neighboring areas of the main pixel, by using the first material composition information of each of the pixels present in the neighboring areas within a predetermined range in which the pixels are adjacent to each other, and optimizing the first material composition information of the main pixel by using the result of the correlation analysis to obtain second material composition information.

According to the present invention, it is possible to optimize the land cover composition of the main pixel by using the land cover composition of the neighboring pixels within a predetermined range, allowing the pixel deposition results to have the spatial correlation while reducing noise.

Further, according to the present invention, in the preprocessing step, it is also possible to perform preprocessing for the image to be decomposed, extract training samples corresponding to the different land cover types present in the actual area with respect to the image to be decomposed, and calculate the probability value of the composition ratio of each land cover type in each pixel by using the statistical value of the extracted training samples, to obtain the first material composition information.

Further, according to the present invention, in the preprocessing step, it is also possible to perform preprocessing for the images to be decomposed, extract the end member vectors of the different land cover types based on the spectral response shown in each frequency band of the land cover types, and determine the probability value of the composition ratio of the different land cover type in each pixel by using the spectral mixing decomposition method, to determine the first material composition information.

Further, according to the present invention, the neighboring areas of each pixel may be the neighboring area on the two-dimensional plane.

Further, according to the present invention, the neighboring areas of each pixel may be the neighboring areas on the three-dimensional space. In the neighborhood correlation calculation step, it is also possible to analyze the correlation between a pixel to be analyzed and the neighboring areas of the particular pixel in the two-dimensional space, and perform again the correlation analysis with the pixel to be determined as the parent pixel, by controlling the neighborhood region used for the pixel decomposition to have a certain stretch based on the image resolution and the correlation analysis result, by determining the new neighborhood region with the stretch as the upper area present on the third dimension, and by determining the second material composition information of the parent pixel as the first material composition information of the corresponding pixel in the upper area, in order to achieve correlation analysis on the multi-dimensional space.

According to the present invention, it is possible to obtain a more accurate land cover composition by sequentially optimizing the analysis results of the upper layers, one by one, based on the pyramid structure.

Further, according to the present invention, in the neighborhood correlation calculation step, it is also possible to determine the stretch of the neighborhood region by using the multi-scale image pyramid method.

Further, according to the present invention, in the neighborhood correlation calculation step, it is also possible to repeat the neighborhood calculation several times in the correlation analysis, to gradually optimize the first material composition information of the image region in order to obtain the second material composition information.

Further, according to the present invention, in the neighborhood correlation calculation step, it is also possible to perform the correlation analysis between the main pixel and the neighboring pixel based on Markov Random Field (MRF).

Further, according to the present invention, in the neighborhood correlation calculation step, it is also possible to set the neighborhood region to an 8-pixel neighborhood region.

Another aspect of the present invention is a decomposition apparatus for refining composition of mixed pixels in remote sensing images to decompose a pixel in which a plurality of types of land cover are mixed, by using the spectral refection characteristics of different land cover types. The decomposition apparatus comprises: a reception unit for receiving a remote sensing image and spectral information corresponding to the received remote sensing image; a preprocessing unit for temporarily determining the probability value of the composition ratio of the different land cover types of each pixel in the image to obtain first material composition information, based on the received remote sensing image and the spectral information; and a neighborhood correlation calculation unit for analyzing the correlation between a main pixel and the neighboring areas of the main pixel, based on the first material composition information of each of the pixels present in the neighboring areas within a predetermined range in which the pixels are adjacent to each other, and optimizing the first material composition information of the main pixel by the result of the correlation analysis, to obtain second material composition information.

According to the present invention, it is possible to obtain more accurate land cover information in such a way that after the initial decomposition is performed for the mixed pixel, the decomposition result is corrected based on the analysis of the correlation of the neighboring pixels.

Note that by generating the multi-scale image, it is possible to solve a problem of the difficulty in the calculation that occurs when a broad neighborhood region is described based on higher-order MRF.

Note that by taking into account the influence of the land cover types of the neighboring pixels after the initial decomposition of each pixel, it is possible to improve the accuracy of the pixel decomposition while reducing noise caused by isolation.

Further, the remote sensing image pixel decomposition and refining method according to the present invention is based on the idea that the neighboring areas are correlated, in which the land cover type information of other pixels in the neighboring areas is added to the decomposition result based on the spectral characteristics of one pixel. In this way, the input of the other initial value is newly corrected by using the local neighborhood correlation analysis model to obtain a new decomposition value, in order to further improve the decomposition accuracy.

DETAILED DESCRIPTION OF THE INVENTION

Hereinafter, preferred embodiments of the present invention will be described with reference to the accompanying drawings.

First Embodiment

Figure 1:
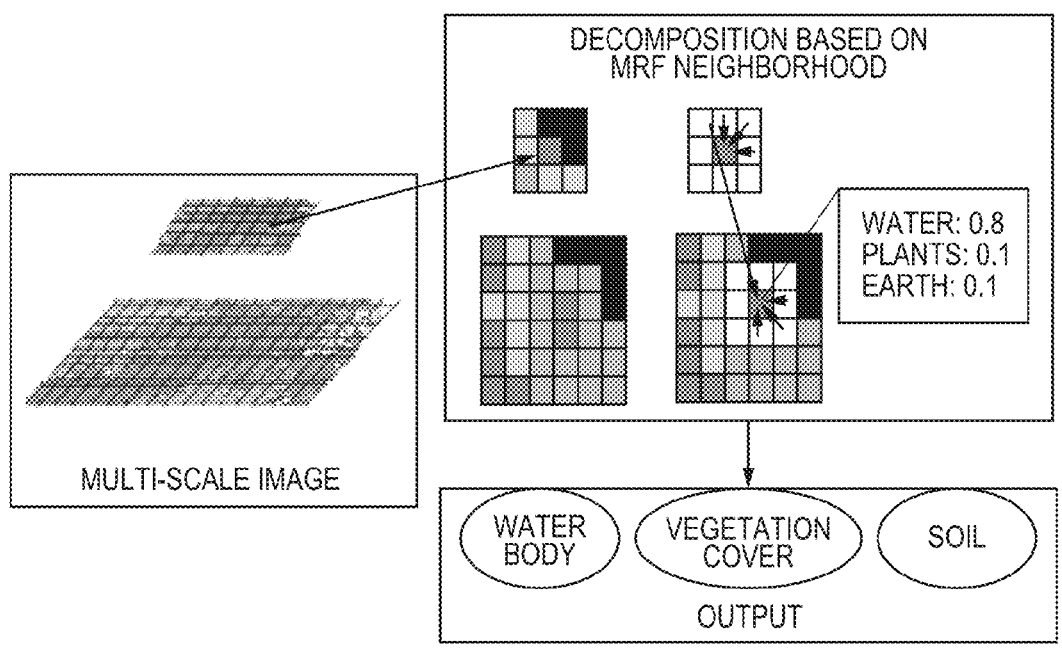
FIG. 1 is a schematic diagram of the decomposition of mixed pixels of remote sensing images based on the neighborhood correlation analyses by a decomposition apparatus for refining composition of mixed pixels according to the present invention.

FIG. 1 is a schematic diagram of the decomposition of mixed pixels in remote sensing images based on the neighborhood correlation analysis by a decomposition apparatus for refining composition of mixed pixels according to the present invention. As shown in FIG. 1, a multi-scale image of a plurality of pixels is input to the decomposition apparatus for refining composition of mixed pixels according to the present invention. Then, the decomposition apparatus performs a decomposition based on an area within the 3×3 pixel region, with respect to the input multi-scale image. Then, the decomposition apparatus outputs the decomposition results including the ratio of the materials of the individual pixels, such as "water body", "vegetation", and "soil" in each pixel.

Figure 2:
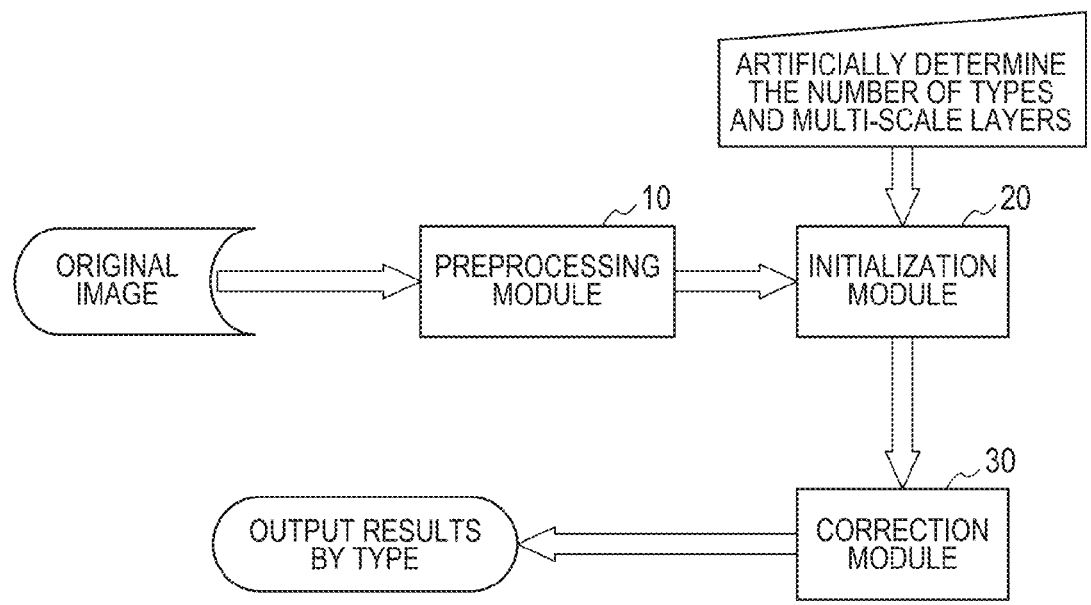
FIG. 2 is a block diagram of the decomposition apparatus for refining composition of mixed pixels according to the present invention.

FIG. 2 is a block diagram of the decomposition apparatus for refining mixed pixels according to the present invention.

As shown in FIG. 2, the decomposition apparatus for refining composition of mixed pixels includes a preprocessing module 10, an initialization module 20, and a correction module 30.

Of the modules of the decomposition apparatus, the preprocessing module 10 can receive an original image from the outside and perform the primary process based on the conventional technology for the original image. For example, the preprocessing module 10 performs radiometric calibration, atmospheric correction, geometric preprocessing, and the like, for the remote sensing image, to remove the error in the non-land cover spectral mixing in the imaging process.

It is also possible to reduce noise by the minimum noise fraction (MNF) algorithm while reducing the redundant information by reducing the dimension of the remote sensing data. In this case, the preprocessing module 10 selects the element with less noise and including 90% or more of the major information, from the elements after transformation. Then, the preprocessing module 10 inputs the selected element to the next process. In this way, it is possible to effectively reduce the amount of data of the subsequent processing. When the data to be processed is a hyperspectral image, the role of the MNF is more important.

These primary processes are not necessarily performed. It is also possible to select the element based on different requirement levels for the image, and to adopt various existing primary processing methods. Thus, the detailed description will be omitted herein.

The initialization module 20 receives the image after the primary processing. Then, the initialization module 20 determines the number of material types to be decomposed or end member types in the image. Then, the initialization module 20 temporarily determines the probability value of the composition ratio of each land cover type in each pixel.

In the determination of the number of material types or end member types, the initialization module 20 can artificially determine a value and directly input the determined value, or can directly use a default value obtained from the history record or other information. It is also possible to obtain the number of types to be decomposed by determining the main type of the land cover types, based on the actual land cover distribution of the image covered area. These parameters can be stored in the initialization module 20 in advance, or may be input from the outside when they are used.

Further, the initialization module 20 can obtain the material composition information by temporality determining the probability value of the composition ratio of each land cover type in each pixel, based on the statistical sampling method or other existing material decomposition methods. Here, the initial material composition information corresponds to the "first material composition information" in the scope of the patent claims.

When the statistical sampling method is used, for example, the initialization module 20 extracts initial training samples or end member vectors for C land cover types, based on the pixel spectral characteristics of the original image. This step differs depending on the initialization method. When the initialization is performed by the fuzzy classification method, it is necessary to select the initial training sample area for each type, calculate the average and covariance of the samples of the individual types, and provide parameters for the calculation of the initial probability by the maximum likelihood method. When the initialization is performed by the method of spectral mixture decomposition, it is necessary to extract the end member vectors of each type so that the first order linear spectral decomposition is performed. Hereinafter, examples of the two methods, the maximum likelihood method and the linear spectral decomposition, will be described.

1. Maximum Likelihood Method

The maximum likelihood method assumes that all the training data of each type in different frequency bands represent the normal (Gaussian) distribution. A single frequency band training data in which the histogram has two or n peaks is not ideal. The probability density function is calculated based on the multi-dimensional spectral characteristics of the training sample data.

When the initialization is performed by the maximum likelihood method, it is necessary to extract the training samples of the individual types. Similarly, the training sample also represents the relatively pure pixel of the material of each land cover type. The different point from the end member in that the end member of the material of each land cover type selects only one "purest" pixel. However, the training sample selects a group of pixels, and there is no concept of "purest" in each pixel of the group. It is only understood that "all the pixels are relatively pure and the material of this type is used as the main material".

The training data of a single frequency band image can be represented by the histogram distribution based on the normal probability density function. The estimated probability function of class $\omega_i$ is calculated by the equation 1.

$$p(x \mid \omega_i) = \frac{1}{2\pi^{1/2}\sigma_i} \exp\left[-\frac{1}{2}\frac{(x-\mu_i)^2}{\sigma_i^2}\right] \quad \text{Equation 1}$$

The training data for a plurality of frequency bands is calculated by the equation 2.

$$p(X \mid \omega_i) = 2\pi^{-N/2}\Sigma^{-1/2}\exp\left\{-\frac{1}{2}(X-M)^T\Sigma^{-1}(X-M)\right\} \quad \text{Equation 2}$$

Assume that there are m types and the unknown vector X is derived from class $\omega_j$, the maximum likelihood discriminant rule is expressed as the equation 3 when, or only when, $X \in \omega_j$.

$$p(X|\omega_i)*p(\omega_i) \geq p(X|\omega_j) \cdot p(\omega_j) \quad \text{Equation 3}$$

If there is no prior probability information $p(\omega_j)$, it can be assumed that the probabilities of the individual types appearing in the scene are the same. The obtained probabilities of the individual types are normalized as percentages of the components of each of the types.

2. Linear Spectral Decomposition

The decomposition based on the spectrum mixed model is, in particular, one of the decomposition methods applied to hyper spectral data. In general, the spectrum mixed model is classified into five types, of which the linear model has high feasibility and applicability in various application fields. The linear model assumes that each pixel in the image is the pixel of each end member, which is obtained by a linear mixture. If X is a single pixel multispectral vector in a multi-channel remote sensing image, A is multi spectrum of the pure land cover signal (end member) of each type or reflection characteristic matrix given by the hyperspectral vector, S is the percentage of the different types of land cover in the pixel, and N is the residual error, a relational expression is given by the equation 4.

$$X = AS + N \quad \text{Equation 4}$$

If the remote sensing image has n frequency bands with m land cover types, X is the vector of n*1, A is the matrix of n*m, S is the vector of m*1, and N is the vector of n*1, and in general, n>m.

When the initialization is performed by the spectral mixture decomposition method, it is necessary to select end member vectors. Each type of simple materials appearing in the image is referred to as an end member. The end member appears as a pure pixel having only one material on the image. A certain kind of pure material, which is an end member vector, corresponds to the spectral vector of the multi-dimensional spectral space. When the end member vector is selected, each type of material selects only one pure pixel.

In the pixel unmixing, S must satisfy the following two constraints at the same time.

(1) The sum of the individual components s in the mixed pixel is 1.

(2) The proportion s of decomposition for each component is between "0, 1".

The decomposition method corresponding to the linear mixed model is the so-called linear spectral decomposition. The decomposition method calculates the components of the individual end members by the least square method.

If the A matrix is non-singular, it is possible to obtain the estimated value of S by the equation 5 based on the least square method.

$$S = (A^T A)^{-1} A^T X \quad \text{Equation 5}$$

In order to ensure to satisfy the two constrains at the same time, the Lagrange multiplier equation such as the equation 6 is developed for the equation 5.

$$I = \frac{1}{2}(X - AS)^T(X - AS) + \lambda(S - \alpha) \quad \text{Equation 6}$$

In the equation 6, $\alpha$ is the received non-negative vector. Then, the iterative solution of the equation 7 is derived.

$$S' = S - (A^T A)^{-1} \lambda$$

$$\lambda = A^T(X - AS') \quad \text{Equation 7}$$

The result obtained by iteration is the estimated value that is appropriate for all.

As described above, the initialization module 20 temporarily determines the probability value of the composition ratio of each land cover type in each pixel based on the determined image and the spectral information of the particular image, according to the maximum likelihood method or linear spectral decomposition, and the like.

The correction module 30 obtains optimized material composition information with respect to each of the pixels in the image. More specifically, the correction module 30 performs a correlation analysis between each pixel and the neighboring areas, by using the initial material composition information that is determined by the initialization module 20 for each of the pixels present in the neighboring areas within a predetermined region in which the individual pixels are adjacent to each other. Then, the correction module 30 optimizes the initial material composition information based on the result of the correlation analysis to obtain the optimized material composition information. Here, the optimized material composition information corresponds to the "second material composition information" in the scope of the patent claims.

It is possible to use Markov Random Field (MRF) method for the correlation analysis. The actual land cover distribution has a certain spatial correlation. In other words, the type of the land cover distribution at a certain point relates to the land cover type of the neighboring areas around the point but has nothing to do with the land cover types in other areas than the neighboring areas.

Such a local correlation characteristics of the image can be described by using the MRF model or other neighborhood correlation models. Thus, the Markov Random Field MRF method is used herein to analyze the correlation between each of the pixels and the neighboring areas in a predetermined range. The predetermined range can be arbitrarily selected depending on the characteristics or type of the image. In general, the 8-pixel neighborhood range has a high reference value and is the preferred range.

The MRF provides the modeling method that is convenient and consistent with the correlation of spatial relations. The most advantage of the modeling method is that it can effectively describe the spatial correlation of various physical phenomena, because of using not only the characteristic information of the pixel point itself but also the correlation between the pixel and its neighboring pixels. Thus, the modeling method can effectively describe the spatial correlation of valorous physical phenomena. In general, all the structures of image fields can be described by the MRF on a finite grid. In this case, the interaction between local pixels can be described by the MRF model of low order neighborhood system. However, the whole image can be considered as a combination of all low-order MRF models. The MRF and Gibbs distributions are consistent with each other. This combination can be considered as an energy function of the neighborhood system, so that one image can be expressed by a pair of energy function. Thus, the study of the MRF model is changed to the study of the energy function.

The random field $X=\{X1, \ldots, XB\}$ is a group of random variables defined on a set of two-dimensional spatial positions $S=\{1, 2, \ldots, B\}$, where B represents the number of pixels in the image. The pixel value xs (s∈S) is one of the realizations of random variables Xs (s∈S), where s is an arbitrary point in the image.

One neighborhood system $N=\{Ns, s\in S\}$ in the image must satisfy the following three conditions.

(1) N is a set of subsets in S.
(2) S does not belong to Ns. In other words, all the points do not belong to the own area.
(3) r∈Ns is equivalent to s∈Nr. In other words, the neighborhood relation is symmetric. In this case, Ns is the neighboring areas of s.

The pixels in the image are related to one another through the neighborhood system. The neighboring areas of the pixels in the boundary of the image are aligned by the following steps: (1) extending the image periodically, (2) obtaining an unknown pixel point by interpolating with known pixel point, and (3) simply filling the known point with zero. The neighborhood system has a different number of stories. In the image model, a partial hierarchical neighborhood system can be established based on the distance from the pixels.

Here, $x=\{x1, x2, \ldots, xB\}$ is one of the realizations of the random variable group $X=\{X1, X2, \ldots, XB\}$. All possible realizations constitute one space Q. $N=\{Ns, s\in S\}$ is the neighborhood system defined on S. If the random field X satisfies the following conditions, x is referred to as MRF with N as the neighborhood system, and the second condition is referred to as the local characteristics of MRF.

(1) $P(X=x)>0 \ \forall x\in Q$
(2) $P(Xs=xs|Xr=xr, r\neq s)=P(Xs=xs|Xr=xr, r\in Ns)$ In a digital image, the gray value of one pixel only relates to the gray value of each pixel in the neighboring areas, so that it is possible to simulate by the MRF.

If there are B pixels to be classified in the image, the pixel vectors are expressed by $x=\{x1, x2, \ldots, xB\}$, in which $B=(i, j)$ is generally the pixel indication method of the image. Further, the types of B pixels are expressed by $\Omega=\{\omega_1, \omega_2, \ldots, \omega_c\}$. This is very similar to the labeling of the individual pixels in the scene, so that it is referred to as scene labeling. Each $\omega_c$ may be one of $c=1, 2, \ldots, C$. The purpose of the classification is to find an image label (or optimal estimation) to match the image label to the actual land cover distribution. $\Omega$ represents the actual land cover distribution. In principle the purpose is to obtain one image label $\tilde{\Omega}$ so that the decomposition results of all the pixels maximize the posterior probability $p(\Omega/X)$. In other words, the image label $\Omega$ should obtain all correct probabilities with respect to a given pixel vector X. This is expressed by the equation 8 based on the Bayes formula.

$$\tilde{\Omega}=\mathrm{argmax}\{p(X|\Omega)p(\Omega)\} \quad \text{Equation 8}$$

In the equation 8, the argmax function selects different $\Omega$ to maximize the independent variable of the particular function, where $p(\Omega)$ is the prior probability of the scene label. If the equation 8 is maximized, the neighboring pixels generally belong to the same type, so that the pixels involved are not independent of each other in the spatial relations. In other words, there is a certain correlation between the neighboring pixels. First, the posterior probability of the pixel level is taken into account. The purpose is to find the type c for the pixel m to maximize $P(\omega_{cm}|x_m, \omega_{\partial m})$, where $\omega_{\partial m}$ represents the type label of the neighboring pixels of the pixel m. Then, the following equation 9 is obtained.

$$p(\omega_{cm} \mid x_m, \omega_{\partial m}) = \frac{p(x_m, \omega_{\partial m}, \omega_{cm})}{p(x_m, \omega_{\partial m})}$$

$$= \frac{p(x_m \mid \omega_{\partial m}, \omega_{cm})p(\omega_{\partial m}, \omega_{cm})}{p(x_m, \omega_{\partial m})}$$

$$= \frac{p(x_m \mid \omega_{\partial m}, \omega_{cm})p(\omega_{cm} \mid \omega_{\partial m})p(\omega_{\partial m})}{p(x_m, \omega_{\partial m})}$$

Equation 9

Although the first term on the right side of the equation 9 is very similar to the conditional probability, the type label of the neighboring pixels is also one of the conditions. In general, when the conditional probability density and the type label of the neighboring pixel are independent of each other, the equation 10 is obtained.

$$p(x_m|\omega_{\partial m},\omega_{cm})=p(x_m|\omega_{cm}) \quad \text{Equation 10}$$

Further, the pixel vector of the center pixel $x_m$ and the type label of the neighboring pixel are independent of each other, so that the following equation 11 is obtained.

$$p(x_m,\omega_{\partial m})=p(x_m)p(\omega_{\partial m}) \quad \text{Equation 11}$$

Thus, the equation 12 is given as follows.

$$p(\omega_{cm} \mid x_m, \omega_{\partial m}) = \frac{p(x_m \mid \omega_{cm})p(\omega_{cm} \mid \omega_{\partial m})p(\omega_{\partial m})}{p(x_m)p(\omega_{\partial m})}$$

$$= \frac{p(x_m \mid \omega_{cm})p(\omega_{cm} \mid \omega_{\partial m})}{p(x_m)}$$

Equation 12

The term of $1/p(x_m)$ does not affect the determination of which type the pixel m belongs to, so that it can be removed from the equation. Thus, the following equation 13 is obtained.

$$p(\omega_{cm}|x_m,\omega_{\partial m}) \propto p(x_m|\omega_{cm})p(\omega_{cm}|\omega_{\partial m}) \quad \text{Equation 13}$$

$p(\omega_{cm}|x_m, \omega_{\partial m})$ represents the probability that the pixel m belongs to the type c under the condition in which the neighboring pixel is classified into an existing type, which is essentially one of the conditional prior probability. In other words, it represents the prior probability of the type label of the center pixel m, under the condition of having the neighboring area.

$p(x_m|\omega_{cm})$ is the type conditional probability, namely, the probability that the land cover pixel value of the c type is $x_m$. If each of the types is the Gaussian normal distribution in the multi-dimensional space, the following equation 14 is obtained.

$$p(x_m | \omega_{cm}) = 2\pi^{-N/2}\Sigma^{-1/2}\exp\left\{-\frac{1}{2}(X-M)^T\Sigma^{-1}(X-M)\right\} \quad \text{Equation 14}$$

The MRF provides the statistical description of the image. Such a model focuses on taking into account the conditional distribution with respect to the neighboring pixel point of each pixel point. This conditional distribution appears as the local characteristics of the random field, so that there is some difficulty in defining the whole filed by the local characteristics. If the number of stories of the neighborhood system is sufficiently large, all of the image data defined on S can be considered as one of the realizations of the MRF. However, the definition of the random field does not clearly show the specific form of the connection probability. For this reason, the use of the random field is not convenient. The equivalence between the MRF and Gibbs fields is proven in the Hammersley-Clifford theorem, in which Besag and other researchers have established the correspondence between the MRF and Gibbs fields. The characteristics of the MRF can be expressed by the Gibbs distribution formula. The equation of the Gibbs model is simple and can effectively describe the local statistical characteristics of a single mass point as well as the combined statistical characteristics of the random fields.

The conditional prior distribution of the equation 14 can be expressed as the equation 15 by using the Gibbs distribution.

$$p(\omega_{cm} | \omega_{\partial m}) = -\frac{1}{Z}\exp\{-U(\omega_{cm})\} \quad \text{Equation 15}$$

In the equation 15, $U(\omega_{cm})$ is the energy function. When the equation 15 is substituted to take the log of both sides, the equation 16 is obtained.

$$\ln\{p(\omega_{cm} | x_m, \omega_{\partial m})\} = \ln\{p(x_m | \omega_{cm})\} + \ln\{p(\omega_{cm} | \omega_{\partial m})\} \quad \text{Equation 16}$$

$$= -\frac{N}{2}\ln(2\pi) - \frac{1}{2}\ln(\Sigma) -$$

$$\frac{1}{2}(X-M)^T\Sigma^{-1}(X-M) +$$

$$\ln\left(\frac{1}{Z}\right) - U(\omega_{cm})$$

When $U(\omega_{cm})$ is the minimum, $p(\omega_{cm}|x_m, \omega_{\partial m})$ is the maximum.

When the first order neighboring area is used and if the number of types is 2, the model of the neighboring area is the Lsing model. Then, the equation 17 is obtained.

$$U(\omega_{cm}) = \sum_{\partial m}\beta[1 - \delta(\omega_{cm}, \omega_{\partial m})] \quad \text{Equation 17}$$

In this way, the correction module 30 can obtain the material composition information after optimization by taking into account the correlation of the neighboring areas, based on the Markov Random Field with the initial material composition information determined by the initialization module 20 as the prior probability.

Further, here the correction module 30 uses the material composition information after Markov Random Field optimization, but the present invention is not necessarily limited to this example. Any other calculation methods can be applied to the present invention as long as the methods can optimize the prior probability by using the correlation characteristics between the pixel and the neighboring areas within a predetermined region.

Further, here the preprocessing module 10 corresponds to the "reception unit" of the decomposition apparatus for refining composition of mixed pixels, the initialization module 20 corresponds to the "preprocessing unit" of the decomposition apparatus for refining composition of mixed pixels, and the correction module 30 corresponds to the "neighborhood correlation calculation unit" of the decomposition apparatus for refining composition of mixed pixels.

Hereinafter, the operation process of the decomposition for refining composition of mixed pixels will be described.

Figure 3:
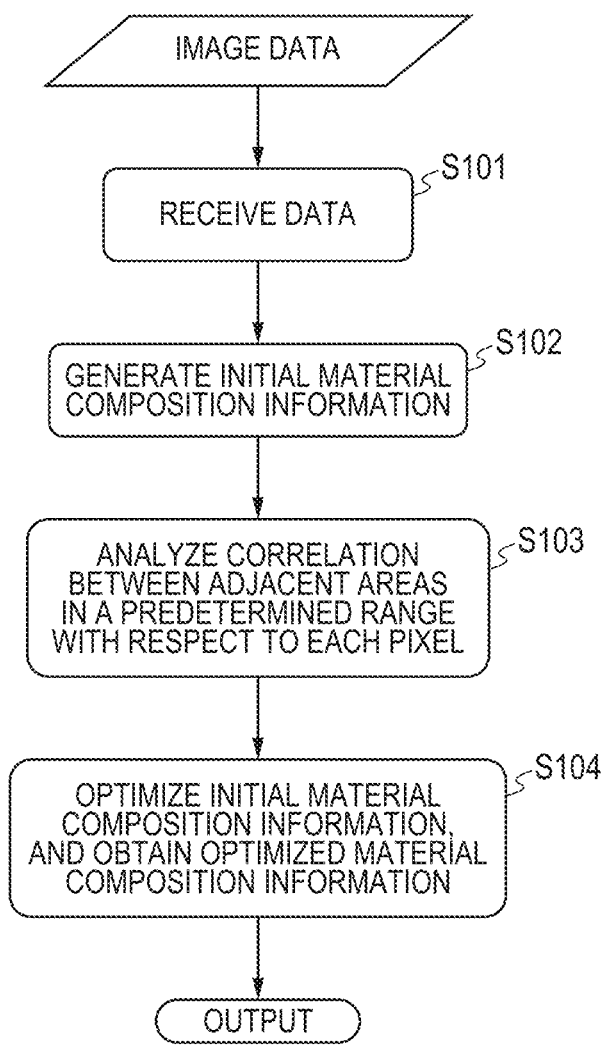
FIG. 3 is a flow chart of a decomposition method for refining composition of mixed pixels according to the present invention.

FIG. 3 is a flow chart of a decomposition method for refining composition of mixed pixels according to the present invention. First, as shown in FIG. 3, the preprocessing module 10 receives the image data as the original data. Then, the preprocessing module 10 performs a primary noise filtering, and the like, for the image data (Step S101).

Next, the initialization module 20 temporarily determines the probability value of the composition ratio of the different land cover types in each pixel to obtain initial material composition information, based on the determined image and the spectral information included in the image according to the maximum likelihood method or linear spectral decomposition, and the like (Step S102).

The correction module 30 receives the initial material composition information and the image information. Then, the correction module 30 uses the information as initial parameters to analyze the correlation between each pixel and each of the neighboring areas, by substituting the initial material composition information of each pixel, the initial material composition information determined by the initial module 20 for the individual pixels present in the neighboring areas within a predetermined range in which the pixels are adjacent to each other, and the image information such as the coordinate information in the remote sensing image, into the correlation analysis model such as the Markov Random Field (Step S103). Then, the correction module 30 calculates the optimized material composition information by taking into account the neighborhood correlation by using the correlation analysis model (Step S104). Further, the correction module 30 outputs the optimization result by material type.

In this way, the decomposition apparatus for refining composition of mixed pixels according to the present invention can output a more accurate probability of the land cover distribution.

Second Embodiment

In the first embodiment, the description has involved optimizing the composition of the initial material composition information of the individual pixels by directly referring to the initial material composition information of each of the pixels in the neighboring areas within a predetermined range of the individual pixels in the image, in the first order neighboring areas.

In a second embodiment, different from the first embodiment, it is designed to obtain more accurate material composition information by performing refined optimization and decomposition several times by changing the scale range in the three-dimensional space by the Gaussian scale space.

The configuration of the decomposition apparatus for refining composition of mixed pixels according to the second embodiment is the same as the configuration in the first embodiment. Thus, the same reference numerals as those in the block diagram shown in FIG. 2 are used, and the repetitive description thereof will be omitted. The operation of the second embodiment, which is different from the first embodiment, will be described in detail below.

In the present embodiment, the preprocessing module 10 receives the original image from the outside. For example, the preprocessing 10 can perform the primary process in the conventional technology for the original image, in order to remove the error of the non-land cover spectral mixing in the imaging process by performing radiometric calibration, atmospheric correction, and geometric preprocessing for the remote sensing image.

Further, the initialization module 20 receives the image after the primary process. Then, the initialization module 20 temporarily determines the probability value of the composition ratio of each land cover type in each pixel, based on the determined image and the spectral information included in the image, according to the maximum likelihood method or linear spectral decomposition, and the like.

The correction module 30 can obtain the material composition information after optimization by taking into account the correlation of the neighboring areas, based on the correlation analysis model such as the Markov Random Field with the initial material composition information determined by the initialization module 20 as the prior probability.

In this case, the Markov Random Field can explain the correlation of neighboring areas of different sizes by the MRF of different number of stories. Thus, in the present embodiment, the correction module 30 generates a Gaussian scale space to establish a three-dimensional image space derived from the original image by the Gaussian scale space.

The Gaussian scale space is the concept in the multi-resolution image analysis field, which is similar to the process that people first perceive things roughly and then finely by the sense of sight. It is possible to generate a series of different resolution images from one image, and the series constitutes the scale space. Gaussian convolution is the unique linear core to achieve scale transformation, in which the Gaussian scale space of the image, as given by the equation 18, can be established by referring to the image to perform convolution by the Gaussian.

$$L(x,y,\sigma)=G(x,y,\sigma)*I(x,y) \quad \text{Equation 18}$$

In the equation 18, $I(x, y)$ represents the pixel value of the x-th row and the y-th column in the original image, and $L(x, y, \sigma)$ represents the pixel value of the x-th row and the y-the column in the image in which the scale factor is $\sigma$ in the generated Gaussian space. The Gaussian convolution core function corresponding to the scale $\sigma$ is given by the equation 19.

$$G(x, y, \sigma) = \frac{1}{2\pi\sigma^2}\exp[(x^2 + y^2)/2\sigma^2] \quad \text{Equation 19}$$

The correction module 30 generates the Gaussian scale space to analyze the correlation between the pixel and the neighboring areas in each layer of the Gaussian scale space. In this way, the correction module 30 can optimize the initial material composition information of the particular pixel. Further, after performing the correlation analysis of a certain layer, the correction module 30 performs again the correlation analysis by using the analysis result of the present layer as the prior probability for the analysis of the next layer, namely, as the initial material composition information in the analysis of the next layer. In this way, the correction module 30 performs the correlation analysis of the layers, one by one, to optimize material composition information for each layer. Then, in the correlation analysis of the next layer, the correction module 30 changes the selection size of the range in the present layer based on the selection size of the given range of the previous layer. In this way, the correction module 30 optimizes the material composition information by referring not only to the neighboring pixels on the plane image in the material decomposition of a certain pixel, but also to the neighboring pixels on the space.

In other words, in the present embodiment, the correction module 30 performs not only the correlation analysis in the first embodiment, but also the correction analysis on the multi-dimensional space by using a certain pixel to be analyzed in the two-dimensional space as the parent pixel. Then, the correction module 30 controls the neighborhood range used for the pixel decomposition to have a certain stretch, based on the image resolution and the correlation analysis result. Then, the correction module 30 performs again the correlation analysis by using the new neighborhood range having the stretch as the upper area on the third dimension, and using the second material composition information of the parent pixel as the first material composition information corresponding to the pixel in the upper area.

Here, the space structure given by the predetermined range, which is selected by the correction module 30 in each layer, is referred to as "pyramid".

The following is the detailed description of the processes of the decomposition method for refining composition of mixed pixel by the maximum likelihood method or the linear spectral decomposition method.

Figure 4:
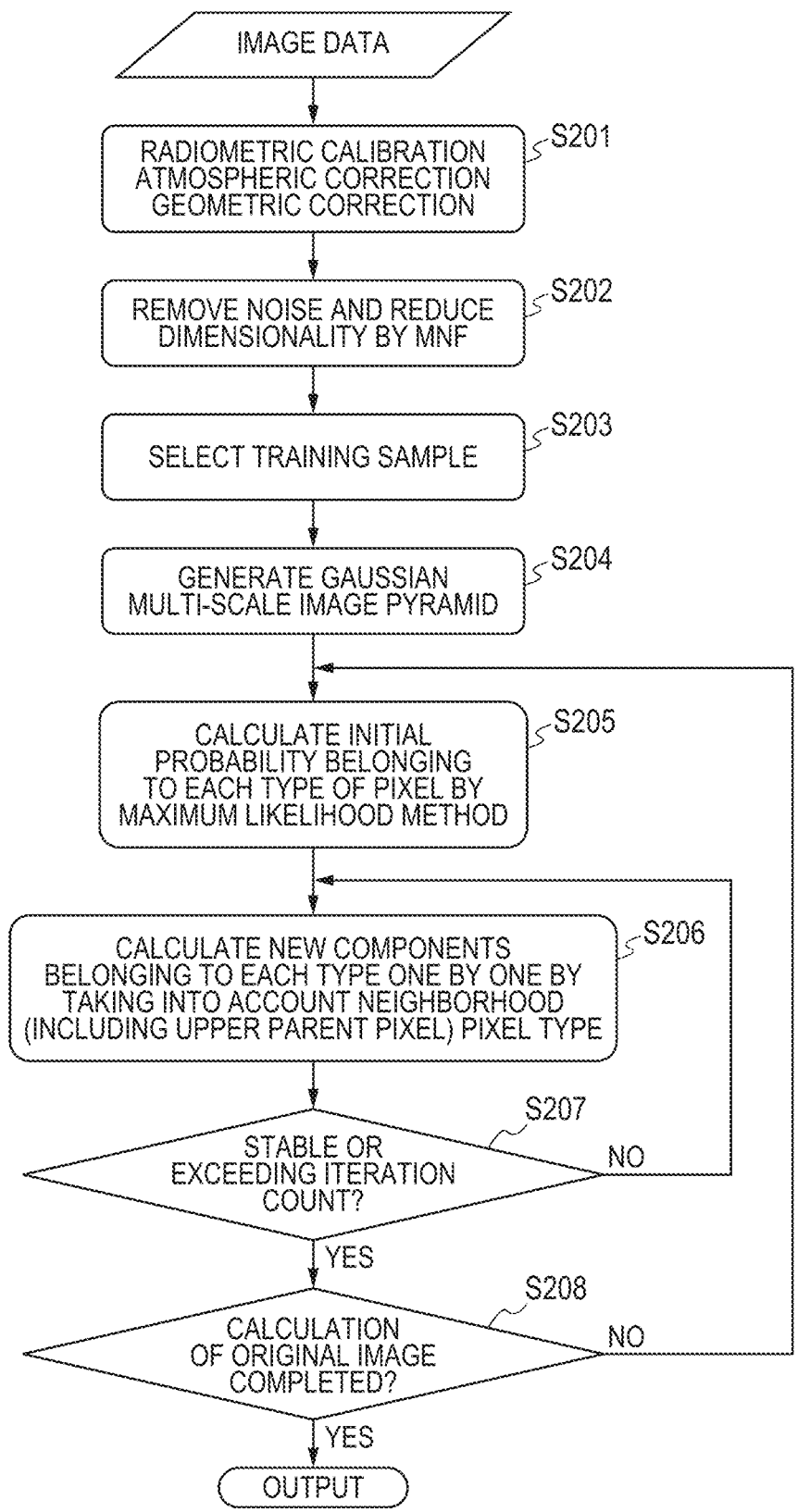
FIG. 4 is a flow chart of a decomposition method for refining composition of mixed pixels according to a second embodiment of the present invention.

FIG. 4 is a flow chart of the decomposition method for refining composition of mixed pixels based on the maximum likelihood method according to the second embodiment of the present invention.

First, as shown in FIG. 4, after receiving the image data, the preprocessing module 10 performs radiometric calibration, atmospheric correction, and geometric preprocessing for the remote sensing image formed by the received image data. In this way, the preprocessing module 10 removes the error of the non-land cover spectral mixing in the imaging process (Step S201).

Next, the preprocessing module 10 attenuates noise by the minimum noise fraction (MNF) algorithm, while reducing the dimension of the remote sensing data to reduce the redundant information (Step S202). There is a small amount of noise selected in the components after transformation, and 90% or more of the components of the main information are included as the input of the post-processing. Because of the processes described above, the amount of data of the subsequent processing can be effectively reduced. If the data to be processed is a hyperspectral image, the role of the MNF is more important.

Next, the initialization module 20 determines the land cover type C of the image to be decomposed. The initialization module 20 determines the main types of land cover included in the image to obtain the number of land cover types to be decomposed, based on the actual land cover distribution of the image covering area. Further, the initialization module 20 extracts initial training samples for C types based on the image spectral characteristics. The extraction of the training samples is different depending on the initialization method. When the initialization is performed by the fussy classification method, it is necessary to select the initial training sample areas for each of the types, calculate the average value and covariance of the individual types, and provide parameter to calculate the initial probability of the maximum likelihood method (Step S203).

Next, the correction module 30 generates a Gaussian multi-scale image pyramid (Step S204). In this step, the correction module 30 determines the scale range and generates the Gaussian scale space. More specifically, for example, the correction module 30 can form a pyramid of four layers with different reduction rates by reducing the original image three times with the reduction rate of the neighborhood scale being 0.5*0.5 times, namely, in the state in which the scale range is reduced to 0.125*0.125 times. The neighboring area of 3*3 size after reduction at the particular scale corresponds to the neighboring area with 24*24 pixels in the original image. At this time, the correction module 30 generates a true pyramid shaped space by combining the neighboring areas with different reduction rates in four layers from the smallest to the largest pixel range, from the top to the bottom. In general, the correction module 30 analyzes the pixel space correlation within this local range. Note that it is also possible to determine the level of the reduction artificially.

It has been proven that the Gaussian scale space is the multi-scale space appropriate for the characteristics of the human sense of sight and that the Gaussian core is the unique linear transformation core used to generate the multi-scale space. It is possible to obtain an image pyramid of Gaussian multi-scale space by convolving the image with the Gaussian core.

Next, the initialization module 20 calculates the initial probability belonging to each type of pixel by the maximum likelihood method (Step S205). After the initial probabilities are calculated, the pixel correction module 30 first calculates the components after optimization for each land core type in the 8 neighboring pixels of the present layer, based on the method proven in the first embodiment, in the top layer, namely, within the minimum range of the pixels. Here, the first layer is the top layer in which the upper layer parent pixel does not exist. Thus, the pixel correction module 30 calculates the optimized components in the top layer (Step S206). Then, the pixel correction module 30 performs an iterative calculation until the calculation result is stable or exceeds a predetermined number of iterations (Step S207). Then, the pixel correction module 30 proceeds to Step S208 to determine whether the calculation of the original image is completed. Here, the "original image" is the image before the neighboring areas are reduced, namely, the image corresponding to the bottom layer of the pyramid.

Because it is the upper first layer, the pixel correction module 30 determines that the answer is "NO" in Step S208, and returns to Step S205 to optimize again the components in the lower layers of the pyramid in the Gaussian space.

In the calculation of the second layer, the correction module 30 takes into account the initial probability of each land cover type based on the maximum likelihood method in the 8 neighboring pixels of the present layer (Step S205). In addition, the correction module 30 also takes into account the optimized components of the upper layer to perform correlation analysis with the neighboring area of the upper layer as the parent pixel, which is defined as neighboring area of the present layer. In other words, the correction module 30 optimizes the components of the present layer by calculating the correlation based on the 8 neighboring pixels of the present layer and on the parent pixel of the first layer. Then, the correction module 30 calculates the components one by one belonging to each type of pixel by taking into account the neighboring pixel type (including the upper parent pixel) in the pyramid on the space (Step S206). More specifically, the following steps are performed from the second layer of the pyramid to the lower layers one by one.

(1) Calculate new corrected components belonging to each type of a particular pixel by using the neighborhood function determined by the MRF mode, based on the current composition of the decomposed components of the 8 neighboring pixels and the parent pixel, for each pixel in the image of the present layer. Here, the pixel corresponding to the same geometric position in the upper layer of the pyramid is referred to as the parent pixel. The neighborhood function affects the type the center pixel of the neighboring pixels belongs to.

(2) Perform iterative calculation until the calculation result is stable with respect to (1) or exceeds a predetermined number of iterations. Determine whether the calculation result is stable, and set the threshold T (for example, T=0.05). If all the variables before and after calculation of the components of each type of all the pixels in the image do not exceed T, the decomposition is considered to be a stable state, and the iterative calculation is ended. It is necessary to set the maximum number of iterations to prevent the situation in which a part of region may not reach the stable state (Step S207).

As described above, the correction module 30 decomposes the pixels in the layers one by one along the pyramid. Finally, the correction module 30 completes the pixel decomposition of the whole image and reaches the bottom layer of the original image. At this time, if the answer is "YES" in Step S208, the correction module 30 outputs the composition results of the decomposed components of the individual types (Step S208).

Further, in the flow chart shown in FIG. 4, the operation for generating the Gaussian multi-scale image pyramid can also be performed after Step S205.

Figure 5:
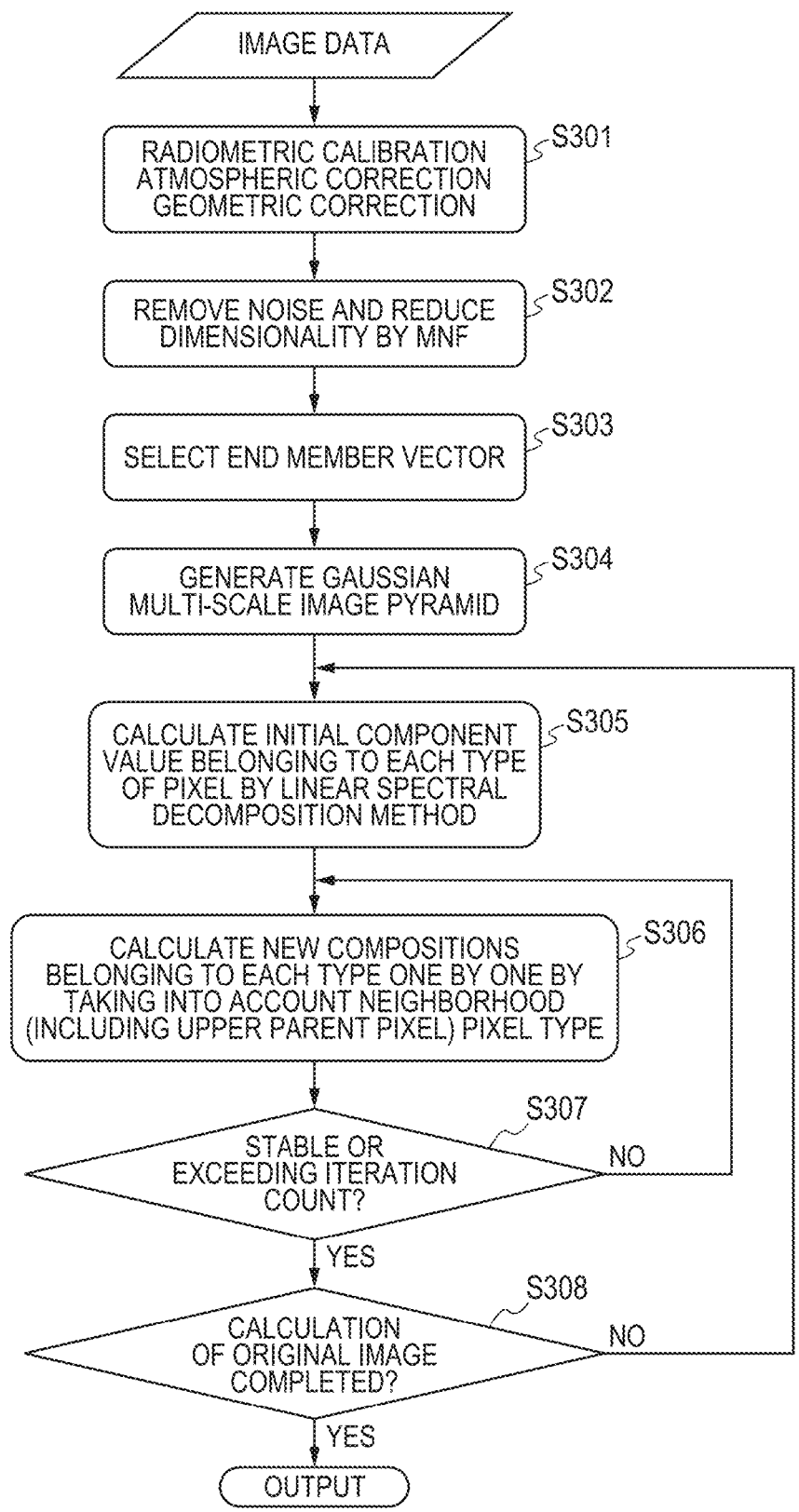
FIG. 5 is another flow chart of the decomposition method for refining composition of mixed pixels according to the second embodiment of the present invention.

FIG. 5 is a flow chart of a decomposition method for refining composition of mixed pixels based on the linear spectral decomposition method, according to the second embodiment of the present invention.

First, as shown in FIG. 5, the preprocessing module 10 receives an image data. Then, the preprocessing module 10 performs radiometric calibration, atmospheric correction, geometric preprocessing, and the like, for the remote sensing image formed by the received image data. In this way, the preprocessing module 10 removes the error of the non-land cover spectral mixing in the imaging process (Step S301).

Next, similar to the process shown in FIG. 4, the preprocessing module 10 attenuates noise by the minimum noise fraction (MNF) algorithm, while reducing the dimension of the remote sensing data to reduce the redundant information (Step S302).

Next, C end member vectors are extracted for each type of land cover (Step S303).

Next, the correction module 30 generates a Gaussian multi-scale image pyramid (Step S304). Here, it is also assumed that the reduction rate of the neighborhood scale is 0.5*0.5 times. The correction module 30 sets the reduction rate to form a true pyramid space given by a four-layer image by reducing the original image three times.

Next, the initialization module 20 calculates the initial component values of each type of pixel by using the linear spectral decomposition method (Step S305). Then, the initialization module 20 obtains the abundance matrix formed by the end members of each type, with the spectral vector of each end member as the variable and with the actual spectral vector of each pixel as the function. After calculating the initial component value, as has been described in FIG. 4, the correction module 30 calculates the optimized components in the 8 neighboring pixels of the first layer. Then, similarly, the correction module 30 determines the optimized components by the iterative process and the like. If it is determined that the answer is "NO" in Step S308, the correction module 30 returns to Step S305, and optimizes the components in the next layer of the pyramid.

In the calculation of the second layer, the correlation analysis is performed with the neighboring pixel of the upper layer as the parent pixel, which is defined as the neighboring area of the present layer, by taking into account not only the initial probability of each land cover type based on the linear spectral decomposition method in the 8 neighboring pixels of the present layer (Step S305), but also the optimized components of the upper layer. In other words, the correction module 30 optimizes the components of the present layer by calculating the correlation based on the 8 neighboring pixels of the present layer and on the parent pixel of the first layer. Then, the correction module 30 calculates the new components one by one belonging to the different types, by taking into account the neighboring pixel type (including the upper parent pixel) in the pyramid on the space (Step S306). More specifically, the correction module 30 performs the following steps from the second layer of the pyramid to the lower layers one by one.

(1) Calculate the new corrected components belonging to each type of a particular pixel by using the neighborhood function determined by the MRF model, based on the current composition of the decomposed components of the 8 neighboring pixels and the parent pixel, for each pixel in the image of the present layer. Here, the pixel corresponding to the same geometric position in the upper layer of the pyramid is referred to as the parent pixel. The neighborhood function affects the type the center pixel of the neighboring pixels belongs to.

(2) Perform iterative calculation until the calculation result is stable with respect to (1) or exceeds a predetermined number of iterations. Determine whether the calculation result is stable, and set the threshold T (for example, T=0.05). If all the variables before and after calculation of the components of each type of all the pixels in the image do not exceed T, it is considered that the decomposition is in a stable state, and the iterative calculation is ended. It is necessary to set the maximum number of iterations to prevent the situation in which a part of region may not reach the stable state (Step S307).

As described above, the correction module 30 decomposes the pixels in the layers one by one along the pyramid. Finally, the correction module 30 completes the pixel decomposition of the whole image and reaches the bottom layer of the original image. After that, if the answer is "YES" in Step S308, the correction module 30 outputs the composition results of the decomposed components of the individual types (Step S308).

As described above, it is possible to calculate the ratio of the different types of land cover in the image more accurately, by using the Gaussian multi-scale image pyramid and the finite number of iterations.

Further, in the flow chart shown in FIG. 5, the operation of generating the Gaussian multi-scale image pyramid in Step S304 can also be performed after Step S305.

The comparison of the results between specific experiments according to the present invention and the conventional technology will be described below.

First Example

Figure 6:
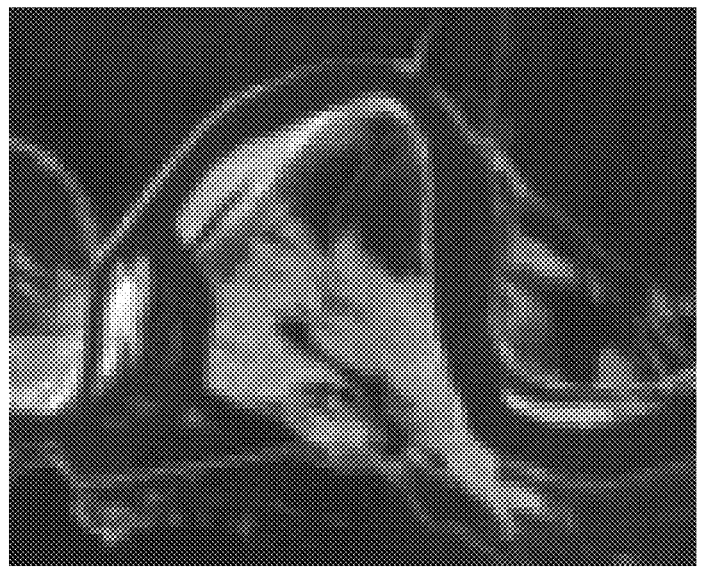
FIG. 6 is a schematic view of a simulated color display of the sample data of the original image according to a first example.

The data source is obtained from the hyper spectral image taken by the hyper-spectral image spectroscopy Hyperione mounted on the Earth Observing-1 Mission (EO-1) satellite, in June, 2004 in Gansu Province, China. The spectral range is from 400 to 2500 nm with 242 frequency bands in total and the resolution of 30 m. The size of the image used for the experiment is 256*768. FIG. 6 is a simulated color image of the particular data. The land cover in this area includes fields, water surface, exposed sands, and cover layer through which water does not pass.

The following steps are performed by the decomposition apparatus for refining composition of mixed pixels according to the present invention.

Step 1: The preprocessing module 10 removes low quality frequency bands, and repairs a broken line part by using 176 frequency bands of better quality of the low-quality ones. Then, the preprocessing module 10 removes noise and reduces the dimension by the MNF.

Step 2: As a result of the examination, it is found that there are six types of land cover in this area (fields, water surface, exposed sands, private residences, and clouds and shadow of clouds). Thus, the determination result is input to the decomposition apparatus from the outside.

Step 3: The initialization module 20 selects training sample areas in the area to which the different types of land cover belong, from the original image. The training sample areas of the different types may have different sizes, but the number of pixels included in each training sample area should be greater than the number of frequency bands.

Step 4: The correction module 30 generates a two-layer multi-scale image pyramid.

Step 5: The initialization module 20 first obtains the initial probability belonging to each type of pixel by the maximum likelihood method, in the image of the first pyramid layer. Then, the initialization module 20 compares the obtained probabilities of the different types for the same pixel, and removes types with too low probability rate. In other words, if the ratio of the maximum probability to the minimum probability is greater than 10000, the initial module 20 gives the value 0 to the minimum probability.

Step 6: When the initial probability values belonging to the different types of the processed pixels are input from the initialization module 20, the correction module 30 performs a neighborhood iterative decomposition by the input initial probability values. The correction module 30 extends the neighborhood of the boundary points of the image based on the closest pixel value. At this time, the parent pixel value is assumed to be 0. The decomposition stability threshold is set to 0.05 and the maximum number of iterations is set to 50.

Step 7: The correction module 30 performs the above process for the second layer pixel of the pyramid. Similarly, the correction module 30 first obtains the initial value by the maximum likelihood method, and determines the decomposition result of the first layer as the source of the parent pixel for the calculation of the decomposition of the pixel neighborhood correlation of the second layer. In this way, the correction module 30 performs an iterative calculation of the second layer by the same method until the calculation result is stable or exceeds the iteration threshold 50.

With respect to the real remote sensing data, there is a small amount of land-cover distribution data as the reference. For this reason, data verification is performed by comparing with the high resolution image classification result. This result matches well the high resolution image identification result, and the accuracy is increased more than in the general classification method.

Second Example

The second example uses the same data as the data of the first example, so that the detailed description thereof will be omitted.

The following steps are performed by using the decomposition apparatus for refining composition of mixed pixels according to the present invention.

Step 1 and Step 2 are the same as those in the first example.

Step 3: The initialization module 20 extracts end member vectors of different types.

Step 4: The correction module 30 generates a two-layer multi-scale image pyramid.

Step 5: The initialization module 20 first performs linear spectral decomposition for each pixel of the image in the first pyramid layer. Then, the correction module 30 decomposes the neighborhood correlation to perform iterative calculation.

Step 6: The image of the second layer of the pyramid is processed. Similarly, the initialization module 20 first performs linear spectral decomposition to obtain the initial value. Then, the correction module 30 expands the boundary value of the initial result, and determines the decomposition result of the first layer as the source of the parent pixel for the calculation of the decomposition of the pixel neighborhood correlation of the second layer. In this way, the correction module 30 performs an iterative calculation of the second layer by the same method until the calculation result is stable or exceeds the iteration threshold 50.

Figure 7A:
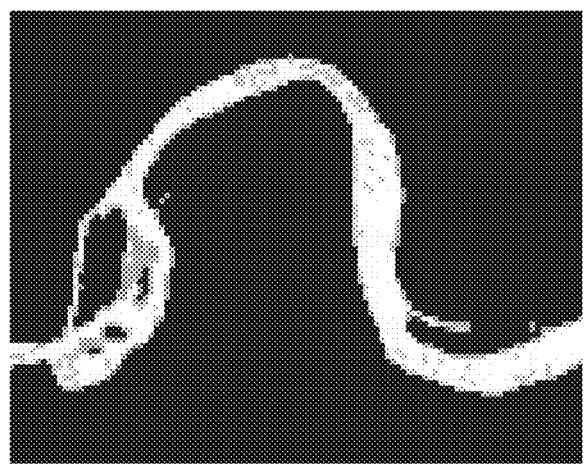
FIG. 7A is a schematic view of the result of the conventional pixel decomposition according to a second example about water surface.
Figure 7B:
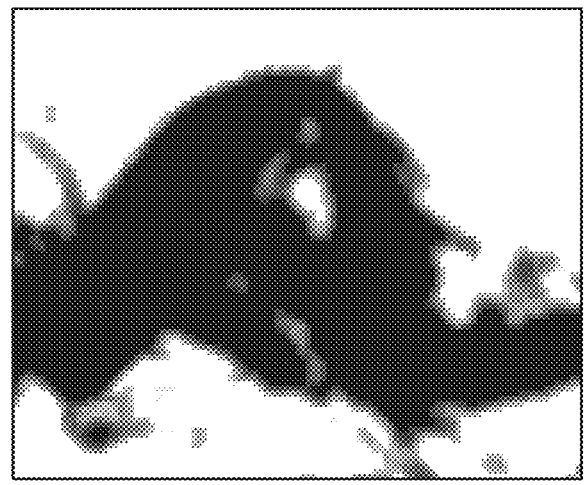
FIG. 7B is a schematic view of the result of the conventional pixel decomposition according to the second example about fields.
Figure 7C:
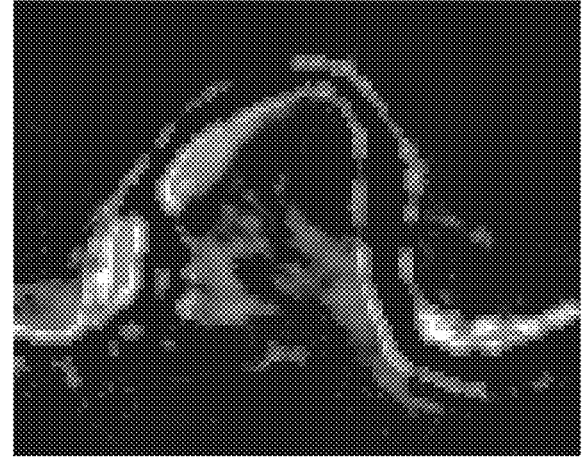
FIG. 7C is a schematic view of the result of the conventional pixel decomposition according to the second example about exposed sands.

The initial decomposition result in the second example is as shown in FIGS. 7A to 7C, in which FIG. 7A shows water surface, FIG. 7B shows fields, and FIG. 7C shows exposed sands.

Figure 8A:
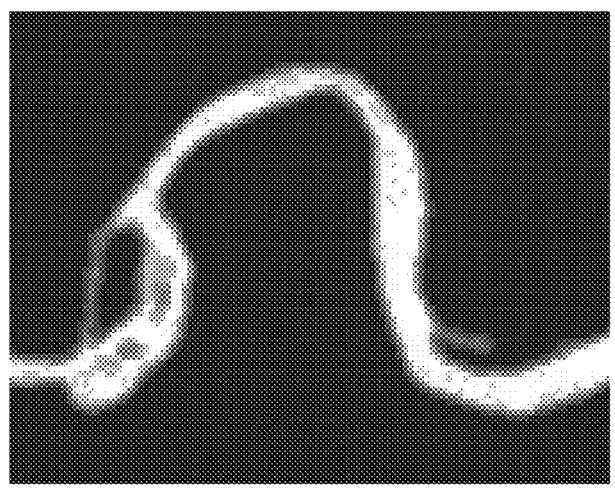
FIG. 8A is a schematic view of the pixel decomposition result based on the neighborhood correlation analysis according to the present invention about water surface.
Figure 8B:
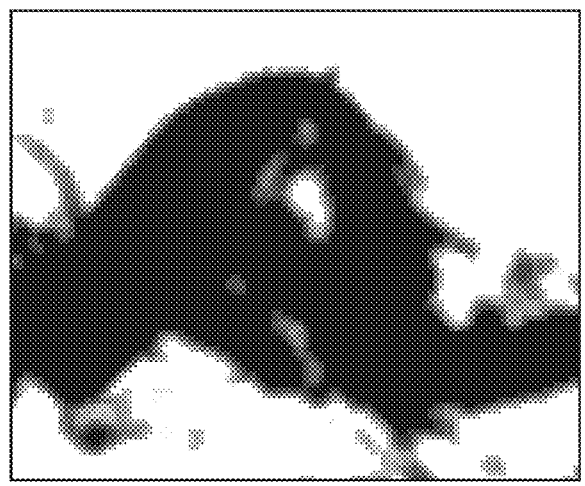
FIG. 8B is a schematic view of the result of the pixel decomposition based on the neighborhood correlation analysis according to the present invention about fields.
Figure 8C:
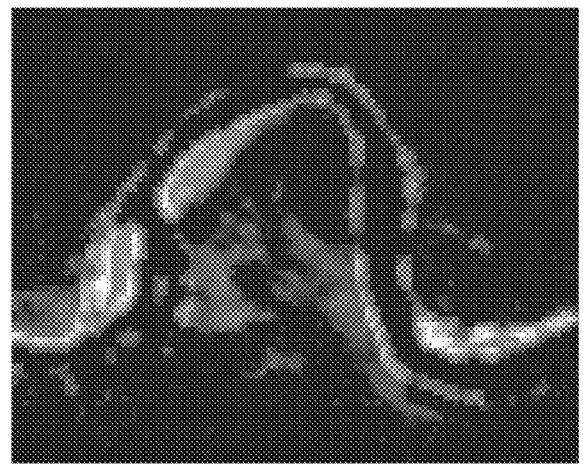
FIG. 8C is a schematic view of the result of the pixel decomposition based on the neighborhood correlation analysis according to the present invention about exposed sands.

FIGS. 8A to 8C show the final decomposition result of the different land cover types, after optimization of the decomposition apparatus for refining composition of mixed pixels according to the present invention. In these figures, FIG. 8A shows water surface, FIG. 8B shows fields, and FIG. 8C shows exposed sands. The value range of the decomposition result is [0 to 1]. The displayed image is extended from 0 to 255, in which the greater the percentage of the land cover component, the brighter the pixel value. In the initial decomposition result, the pixel of the same type is decomposed into components of other types. This is because although the linear decomposition algorithm is only applied to the ideal linear mixed model, the actual mixed pixel itself is mixed with different types and is influenced by the neighboring elements, so that the spectral characteristics are changed. After optimization of the decomposition apparatus according to the present invention, the component of the particular type in the decomposition result of the pixel of this type is improved, while the pixels in the transition zone still keep the mixing state.

Figure 9A:
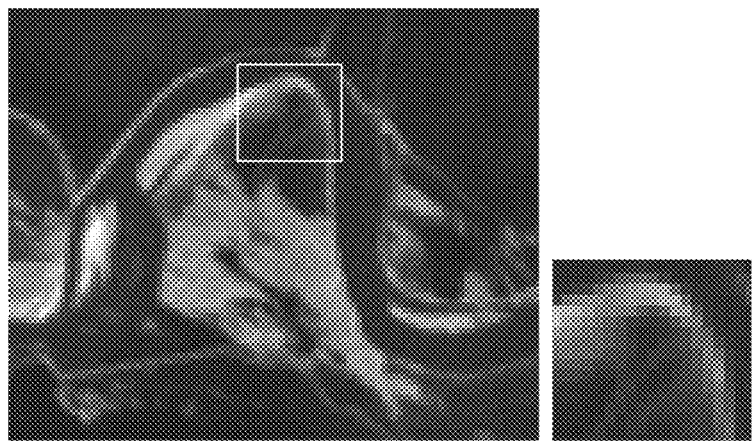
FIG. 9A is a detailed view of an original image.
Figure 9B:
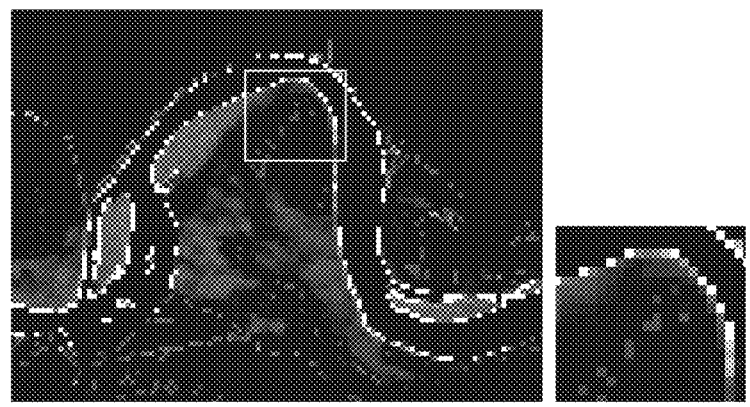
FIG. 9B is a detailed view of the conventional pixel decomposition result.
Figure 9C:
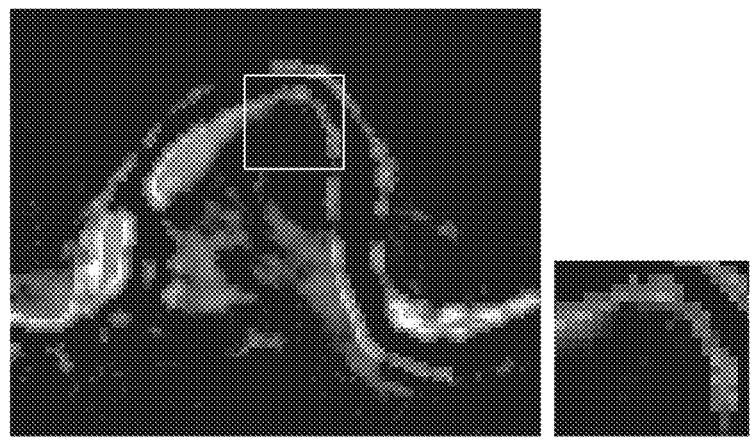
FIG. 9C is a detailed view of the neighborhood correlation decomposition result according to the present invention.

FIGS. 9A to 9C are detailed views comparing the conventional pixel decomposition result and the neighborhood correlation decomposition result in the type of sands. In these figures, FIG. 9A shows the original view and an enlarged view of a part of the original view, FIG. 9B shows the image in the conventional decomposition process result and an enlarged view of a part of the image, and FIG. 9C shows the image in the neighborhood correlation decomposition result according to the present invention and an enlarged view of a part of the image.

In the case of FIGS. 9A to 9C, Table 1 and Table 2 show the decomposition values of the sands in the local area extracted from the process result. More specifically, Table 1 shows the decomposition result when the neighborhood correlation calculation is not optimized. Table 2 shows the result when the neighborhood correlation calculation is optimized. By comparing Table 1 and Table 2, it is possible to understand that the components of the isolated pixels are effectively suppressed by the process according to the present invention.

TABLE 1

| 0 | 0 | 0 | 0 | 0 |
| 0 | 0 | 0.26 | 0 | 0 |
| 0 | 0 | 0 | 0.26 | 0 |
| 0.25 | 0 | 0 | 0 | 0 |
| 0 | 0 | 0.26 | 0 | 0 |

TABLE 2

| 0 | 0 | 0 | 0 | 0 |
| 0 | 0 | 0.003 | 0 | 0 |
| 0 | 0 | 0 | 0.003 | 0 |
| 0 | 0 | 0 | 0 | 0 |
| 0 | 0 | 0.03 | 0 | 0 |

Table 3 shows the decomposition result when the neighborhood correlation calculation is not optimized for the pixels in the transition zone. Table 4 shows the result when the neighborhood correlation calculation is optimized for the pixels in the transition zone. By comparing Table 3 and Table 4, it is possible to understand that the state of transition decomposition present in the boundary pixels in Table 3 is well-balanced after optimization of the neighborhood correlation calculation in Table 4.

TABLE 3

| 0 | 0 | 0 | 0 | 0 |
| 0.74 | 1 | 0 | 0 | 0 |
| 0.22 | 0.30 | 0.59 | 0 | 0 |
| 0.18 | 0.24 | 0.28 | 0.55 | 0 |
| 0 | 0 | 0.11 | 0.20 | 1 |

TABLE 4

| 0.26 | 0.25 | 0 | 0 | 0 |
| 0.29 | 0.28 | 0.25 | 0 | 0 |
| 0.42 | 0.36 | 0.22 | 0 | 0 |
| 0.17 | 0.21 | 0.22 | 0.19 | 0 |
| 0 | 0 | 0.12 | 0.24 | 0.20 |

Based on the experiments in the above examples, it is possible to understand that the present invention can obtain more accurate land cover information than in the conventional technology, and can increase the pixel decomposition accuracy while reducing noise caused by isolation.

Accordingly, the present invention can be applied to the fields requiring analysis of the land cover state of remote sensing images.

What is claimed is:

1. A decomposition method for refining composition of mixed pixels in remote sensing images to decompose the composition of different land cover types of a pixel in which a plurality of types of land cover are mixed, by using the spectral refection characteristics of the different land cover types, wherein the decomposition method comprises:
   a receiving step for receiving a remote sensing image and spectral information corresponding to the received remote sensing image;
   preprocessing step for temporarily determining a probability value of a composition ratio of different land cover types of each pixel in the image, based on the received remote sensing image and the spectral information, to obtain first material composition information; and
   a neighborhood correlation calculation step for analyzing the correlation between a main pixel and the neighboring areas of the main pixel, by using the first material composition information of each of the pixels present in the neighboring areas within a predetermined range in which the pixels are adjacent to each other, and optimizing the first material composition information of the main pixel by using the result of the correlation analysis, to obtain second material composition information,
   wherein the preprocessing step includes performing preprocessing for the image to be decomposed, extracting training samples corresponding to the different land cover types present in the actual area with respect to the image to be decomposed, and calculating the probability value of the composition ratio of each land cover type in each pixel by using the statistical value of the extracted training samples, to obtain the first material composition information.

2. The decomposition method for refining composition of mixed pixels according to claim 1,
   wherein the neighborhood correlation calculation step analyzes the correlation between the main pixel and the neighboring pixels by the Markov Random Field.

3. The decomposition method for refining composition of mixed pixels according to claim 1,
   wherein the neighboring areas of each pixel are the neighboring areas on the two-dimensional plane.

4. A decomposition method for refining composition of mixed pixels in remote sensing images to decompose the composition of different land cover types of a pixel in which a plurality of types of land cover are mixed, by using the spectral refection characteristics of the different land cover types, wherein the decomposition method comprises:
   a receiving step for receiving a remote sensing image and spectral information corresponding to the received remote sensing image;
   preprocessing step for temporarily determining a probability value of a composition ratio of different land cover types of each pixel in the image, based on the received remote sensing image and the spectral information, to obtain first material composition information; and
   a neighborhood correlation calculation step for analyzing the correlation between a main pixel and the neighboring areas of the main pixel, by using the first material composition information of each of the pixels present in the neighboring areas within a predetermined range in which the pixels are adjacent to each other, and optimizing the first material composition information of the main pixel by using the result of the correlation analysis, to obtain second material composition information,
   wherein the neighboring areas of each pixel are the neighboring areas on the three-dimensional plane,
   wherein the neighborhood correlation calculation step analyzes the correlation between a pixel to be analyzed and the neighboring areas of the pixel in the two-dimensional space, and
   wherein the neighborhood correlation calculation step analyzes again the correlation with the pixel to be determined as the parent pixel, by controlling the neighborhood region used for the decomposition of the pixel to have a certain stretch based on the image resolution and the correlation analysis result, by determining the new neighborhood region with the stretch as the upper area present on the third dimension, and by determining the second composition information of the parent pixel as the first material composition information of the corresponding pixel in the upper area, in order to achieve correlation analysis on the multi-dimensional space.

5. The decomposition method for refining composition of mixed pixels according to claim 4,
   wherein the neighborhood correlation calculation step determines the stretch of the neighborhood region by the multi-scale image pyramid method.

6. A decomposition method for refining composition of mixed pixels in remote sensing images to decompose the composition of different land cover types of a pixel in which a plurality of types of land cover are mixed, by using the spectral refection characteristics of the different land cover types, wherein the decomposition method comprises:
   a receiving step for receiving a remote sensing image and spectral information corresponding to the received remote sensing image;
   preprocessing step for temporarily determining a probability value of a composition ratio of different land cover types of each pixel in the image, based on the received remote sensing image and the spectral information, to obtain first material composition information; and
   a neighborhood correlation calculation step for analyzing the correlation between a main pixel and the neighboring areas of the main pixel, by using the first material composition information of each of the pixels present in the neighboring areas within a predetermined range in which the pixels are adjacent to each other, and optimizing the first material composition information of the main pixel by using the result of the correlation analysis, to obtain second material composition information,
   wherein the neighborhood correlation calculation step performs the correlation analysis by repeating the neighborhood correlation calculation several times, and gradually optimizing the first material composition information of the image region to obtain the second material composition information.

7. A decomposition method for refining composition of mixed pixels in remote sensing images to decompose the composition of different land cover types of a pixel in which a plurality of types of land cover are mixed, by using the spectral refection characteristics of the different land cover types, wherein the decomposition method comprises:
   a receiving step for receiving a remote sensing image and spectral information corresponding to the received remote sensing image;
   preprocessing step for temporarily determining a probability value of a composition ratio of different land cover types of each pixel in the image, based on the received remote sensing image and the spectral information, to obtain first material composition information; and
   a neighborhood correlation calculation step for analyzing the correlation between a main pixel and the neighboring areas of the main pixel, by using the first material composition information of each of the pixels present in the neighboring areas within a predetermined range in which the pixels are adjacent to each other, and optimizing the first material composition information of the main pixel by using the result of the correlation analysis, to obtain second material composition information, wherein the neighborhood correlation calculation step sets the neighborhood region to an 8-pixel neighborhood region.

* * * * *